Patented Sept. 3, 1935

2,013,034

UNITED STATES PATENT OFFICE 2,013,034

SUGAR ACYLATION

Gerald J. Cox and John H. Ferguson, Pittsburgh, Pa., assignors, by mesne assignments, to Niacet Chemicals Corporation, New York, N. Y., a corporation of New York No Drawing. Application June 22, 1932, Serial No. 618,697

22 Claims. (Cl. 260—101)

This invention relates to an improved method of acylating sugars, more particularly it relates to the preparation of the lower fatty acid esters of mono and disaccharides and the production of solutions of such esters in organic solvents directly without first producing the esters in crystalline or other solid form.

In the older methods of preparing esters of sugars, the sugar is caused to react with a fatty acid anhydride, for example acetic anhydride, in the presence of more than its own weight of anhydrous sodium acetate which is sufficient to cause the reaction to proceed with explosive speed. The product obtained by such acetylation is washed with water to remove the unreacted acetic anhydride, the sodium acetate and the acetic acid produced in the reaction. The large quantity of sodium acetate used prevents the effective distillation of acetic acid from the product, acetic anhydride is used in considerable excess of the theoretical requirement and the excess is destroyed by water, and the washing of the product with water dilutes the acetic acid and reduces its value as a product of the reaction.

According to the present invention, the reagents are employed in quite different proportions and the rate of reaction can be controlled. Excess anhydride and preferably also acid formed by the reaction are advantageously recovered from the reaction mixture by distillation and the tedious process of washing with water to remove residual acid and anhydride may be replaced by one of neutralization with a basic solid. Improved yields are obtained by the new process.

The improved process of this invention involves the reaction of a fatty acid anhydride with the sugar in the presence of an acylation catalyst, for example on alkali metal carbonate or an alkali metal salt of an organic acid, such as sodium carbonate, sodium bicarbonate, sodium acetate, potassium carbonate, potassium bicarbonate, potassium acetate, potassium propionate or potassium butyrate. When an alkali metal carbonate or bicarbonate is used it reacts with the acetylating reagent to form an alkali metal salt of the organic acid. The acylation may be controlled by the gradual addition of one of the reacting constituents to the other at the reaction temperature in the presence of the catalyst. The amount of catalyst employed may be varied, but we use not more than one part of catalyst for one part of sugar. For example, in acetylating sugar, using sodium acetate as a catalyst, we use not more than one part of sodium acetate for one part of sugar and preferably we employ a small fraction of one part, for example, about one-tenth of one part of sodium acetate. Sodium acetate retains acetic acid by combination in a crystalline form and also mechanically so that by the use of only a small amount of sodium acetate as catalyst, more acetic acid can be removed and recovered by distillation than would be possible by the former methods where a large amount of sodium acetate is employed. Using a small amount of catalyst, the reaction proceeds slowly and can be controlled readily for any scale of production and the cost of the catalyst is reduced. By omitting the excess of catalyst, the purity of the product obtained is improved.

We find it advantageous to recover excess of acid anhydride and glacial acetic acid or other acid formed by the reaction by distillation from the reaction mass after the acylation has been completed. The ester may then be obtained by crystallization from an organic solvent or from water solution, or it may advantageously be brought directly into solution in an organic solvent. The remaining acid may be neutralized by a basic solid such as sodium carbonate, sodium bicarbonate, potassium carbonate, potassium bicarbonate, magnesium carbonate, calcium carbonate or solid hydrated lime to produce a substantially acid-free solution, or for various purposes the acid need not be neutralized. In the latter case, it is desirable to add sufficient solvent to reduce the viscosity so that the precipitated catalyst can be removed by filtration. The color of the solutions of the sugar esters may be improved by the use of decolorizing carbons.

Among the sugars which may be acylated according to this invention, the following may be mentioned by way of illustration—sucrose, glucose, lactose, maltose and xylose which may be acylated to produce, for example, acetates, propionates, butyrates and valerates.

Sucrose octa-acetate may be produced from sucrose, as follows: One part of sucrose and one-tenth part of anhydrous sodium acetate are added slowly to three parts of boiling acetic anhydride. After all of the sugar is dissolved, the solution is heated under a reflux condenser for from twenty minutes to an hour. Excess acetic anhydride and acetic acid are then distilled off and the acid and anhydride mixture thus obtained may be fractionated by known methods or used in such processes as require mixtures of acids and anhydrides.

The sucrose octa-acetate thus produced may be recovered by crystallization or a solution in an organic solvent may be obtained directly.

Such a solution forms a desirable means for incorporating the sugar esters in lacquers, etc.

To obtain the sucrose octa-acetate from the distillation residue in crystalline form, alcohol may be added to the residue and the ester crystallized from the alcohol.

Instead of crystallizing from alcohol, the syrupy residue remaining after removal of acetic anhydride and acetic acid by distillation may be poured into several volumes of water, for example, five volumes of water, and stirred thoroughly to decompose the residual acetic anhydride and to dissolve the acetic acid and sodium acetate in the water. The water extract is then removed by decantation and replaced by fresh water and the process repeated until the ester crystallizes. The crystallized sucrose octa-acetate is then ground to a powder and washed with water until the washings are neutral to litmus-paper. The ester is then dried.

According to a preferred method of operation, the ester is obtained directly in solution in an organic solvent without first being produced in crystallized form. To obtain such a solution, the residue remaining after the distillation of acetic acid and acetic anhydride from the reaction mass, is dissolved in a solvent such as benzene or toluene and then neutralized by the addition of a basic solid such as hydrated lime. The base is generally added in an amount in excess of the residual acetic acid and acetic anhydride present, which may be determined by analysis, although a lesser amount may be added if desired. The mixture is heated with stirring until the acidity is reduced the desired amount. The precipitated sodium and calcium acetates and excess of hydrated lime are removed by filtration and the solution of the sucrose octa-acetate may then be diluted or distilled to any desired concentration depending upon the use to which it is to be put. By distilling to produce a highly concentrated solution, the ester may be recovered from solution in the organic solvent by crystallization.

The invention is not limited to the production of esters of sucrose, but includes esters of other sugars, such as acetates of lactose, glucose and xylose which may be produced in the manner described by the acetylation of these other sugars. It includes esters of other acids such as sucrose butyrate which may be produced as follows:

11 grams of sodium carbonate are added to 715 grams of butyric anhydride and the mixture is heated to 185° C., then 170 grams of sucrose are added slowly and the mixture is boiled under a reflux condenser for thirty minutes after the addition of the last of the sugar. Butyric acid and anhydride are then removed by distillation in vacuo. To produce a solution of the ester in an organic solvent, the distillation residue is dissolved in toluene or other suitable solvent and treated with slaked lime or other basic solid which is kept suspended in the boiling toluene solution until no more free acid is present. The precipitated sodium butyrate and calcium butyrate are then filtered off with any excess lime.

We claim:

1. The method of acylating sugars which comprises treating one part of sugar with a lower fatty acid anhydride at about the boiling point in the presence of not more than one part of a lower fatty acid salt of an alkali metal as catalyst.

2. The method of acylating sugars which comprises treating a sugar with a lower fatty acid anhydride in the presence of a small amount of an alkali metal salt of a lower fatty acid as catalyst, the amount of said catalyst being less than the amount of the sugar treated.

3. The method of acylating sugars which comprises reacting one part of sugar with a lower fatty acid anhydride in the presence of not more than one part of a salt of a lower fatty acid from the group consisting of the sodium and potassium salts, as a catalyst.

4. The method of acylating sugars which comprises treating one part of sugar with an excess of a lower fatty acid anhydride at about its boiling point in the presence of a small fraction of one part of an alkali metal salt of a lower fatty acid as catalyst.

5. The method of acylating sugars which comprises reacting sugar and a lower fatty acid anhydride in the presence of an amount of an alkali metal salt of a lower fatty acid as catalyst which is less than the amount of the sugar by gradually adding one of the reactants to the other.

6. The method of acylating sugars which comprises reacting sugar and a lower fatty acid anhydride in the presence of an alkali metal salt of a lower fatty acid as catalyst, the amount of such catalyst being less than the amount of the sugar, and then distilling from the products of the reaction fatty acid produced by the acylation.

7. The method of acylating sugars which comprises reacting a sugar and a lower fatty acid anhydride in the presence of an alkali metal salt of a lower fatty acid as catalyst, the amount of such catalyst being less than the amount of the sugar, and then distilling excess fatty acid anhydride from the products of the reaction.

8. The method of preparing a solution of a sugar ester in an organic solvent which comprises acylating the sugar by reaction with a lower fatty acid anhydride in the presence of an alkali metal salt of a lower fatty acid as catalyst, in amount less than the amount of the sugar, distilling unreacted anhydride from the reaction mass and dissolving the ester from the product of the reaction by an organic solvent without first crystallizing the sugar ester.

9. The method of neutralizing a solution of a sugar ester in an organic solvent produced according to the process of the preceding claim which comprises adding a basic solid to the solution.

10. The method of producing sugar esters which comprises acylating a sugar by reaction with a lower fatty acid anhydride in the presence of a small amount, less than the amount of the sugar, of an alkali metal salt of a lower fatty acid as catalyst, and then distilling excess fatty acid anhydride and fatty acid produced during the reaction from the products of the reaction before crystallizing the ester.

11. The method of preparing a solution of a sugar ester which comprises acylating a sugar by reaction with a lower fatty acid anhydride in the presence of an alkali metal salt of a lower fatty acid as catalyst, in amount less than the amount of the sugar, distilling from the products of the reaction excess fatty acid anhydride and fatty acid produced by the acylation, dissolving the distillation residue in an organic solvent and then neutralizing acid in the solution by a basic solid.

12. The method of acetylating sugars which comprises reacting the sugar with acetic anhydride in the presence of sodium acetate as catalyst in amount less than the amount of sugar and at a temperature near the boiling point of acetic anhydride and then distilling acetic anhydride and acetic acid produced during the acylation from the products of the reaction.

13. The method of acetylating sugars which comprises reacting one part of sugar with an excess of acetic anhydride in the presence of a small fraction of one part of sodium acetate as catalyst at about the boiling point.

14. The method of acylating sucrose which comprises reacting sucrose with a lower fatty acid anhydride in the presence of an alkali metal salt of a lower fatty acid as catalyst at about the boiling point and then distilling from the products of the reaction excess acid anhydride and acid produced during the reaction.

15. The method of acylating sucrose which comprises reacting one part of sucrose with a lower fatty acid anhydride in the presence of a small fraction of one part of an alkali metal salt of a lower fatty acid.

16. The method of preparing a solution of a sugar ester in an organic solvent which comprises acylating the sugar with a lower fatty acid anhydride in the presence of an alkali metal salt of a lower fatty acid as catalyst in amount less than the amount of the sugar, distilling excess acid anhydride from the products of the reaction, dissolving the sugar ester in an organic solvent and filtering the catalyst from the resulting solution.

17. The method of freeing an acylated sugar, containing an amount of an alkali metal salt of a lower fatty acid less than the amount of the sugar acylated, from any excess acylating agent and acid reaction products produced in the acylation of the sugar which comprises diluting the product of the reaction with an organic solvent for the acylated sugar and neutralizing the reaction products and any excess acylating agent present by means of a basic solid.

18. The method of producing a solution of the octa-acetate of sucrose which comprises acetylating the sucrose by reaction with acetic anhydride in the presence of an amount of alkali metal acetate as catalyst less than the amount of the sucrose acylated, distilling from the products of the reaction any excess acetic anhydride and acetic acid produced during the reaction, dissolving sucrose octa-acetate from the resulting residue in an organic solvent and filtering to remove insoluble material.

19. The method of producing an acid free solution of an acylated sugar which comprises acylating the sugar with the aid of an alkali metal salt of a lower fatty acid as catalyst in amount less than the amount of the sugar acylated, distilling from the reaction product most of the excess acylation agent and other volatile products, treating the remaining material with an organic solvent for the acylated sugar, neutralizing acid substances including excess acylation agent which are present in the resulting solution with a basic solid and then filtering to remove all insoluble material.

20. The method of obtaining an acylated sugar in crystalline form which consists in treating the sugar with an excess of an acylation agent and an amount of an alkali metal salt of a lower fatty acid as catalyst which is less than the amount of the sugar treated, distilling part of the excess of the acylation agent and other volatile constituents of the reaction product from the resulting mass, dissolving the soluble material from the resulting mass in an organic solvent for the acylated sugar, neutralizing the acylating agent and other acid constituents present in the solution with a basic solid and adjusting the concentration of the acylated sugar in the solvent so that it may be crystallized therefrom.

21. The method of preparing sucrose acetate which comprises reacting one part of sucrose with an excess of acetic anhydride at about its boiling point in the presence of less than one part of a lower fatty acid salt of an alkali metal.

22. The method of preparing sucrose acetate which comprises reacting one part of sucrose with an excess of acetic anhydride at about its boiling point in the presence of less than one part of an alkali metal acetate.

GERALD J. COX.
JOHN H. FERGUSON.